United States Patent

[11] 3,604,275

| [72] | Inventors | Terrence S. Fox;<br>Glen W. Driskill, both of Phoenix, Ariz. |
|---|---|---|
| [21] | Appl. No | 769,951 |
| [22] | Filed | Oct. 23, 1968 |
| [45] | Patented | Sept. 14, 1971 |
| [73] | Assignee | Sperry Rand Corporation |

[54] TOROIDAL ELECTROLYTIC SENSOR
9 Claims, 6 Drawing Figs.

[52] U.S. Cl. .............................................. 74/5.4,
33/206
[51] Int. Cl. .................................................... G01c19/46,
G01c 9/06
[50] Field of Search.......................................... 74/5.4, 5.6;
33/206; 73/516, 505

[56] References Cited
UNITED STATES PATENTS

| 1,317,072 | 9/1919 | Carlier | 33/206 UX |
| 1,593,363 | 7/1926 | Schoute | 33/206 UX |
| 2,802,918 | 8/1957 | Boyle | 74/5.6 UX |
| 3,171,213 | 3/1965 | Swarts et al. | 33/206 |
| 3,260,121 | 7/1966 | Johnston | 73/516 X |
| 3,442,023 | 5/1969 | Remington et al. | 33/206 |

Primary Examiner—Manuel A. Antonakas
Attorney—S. C. Yeaton

ABSTRACT: A toroidal electrolytic sensor having substantially symmetrical diametrically opposed electrodes for providing an electrical signal in accordance with the relative immersion of the electrodes with respect to each other.

PATENTED SEP 14 1971
3,604,275
SHEET 1 OF 3
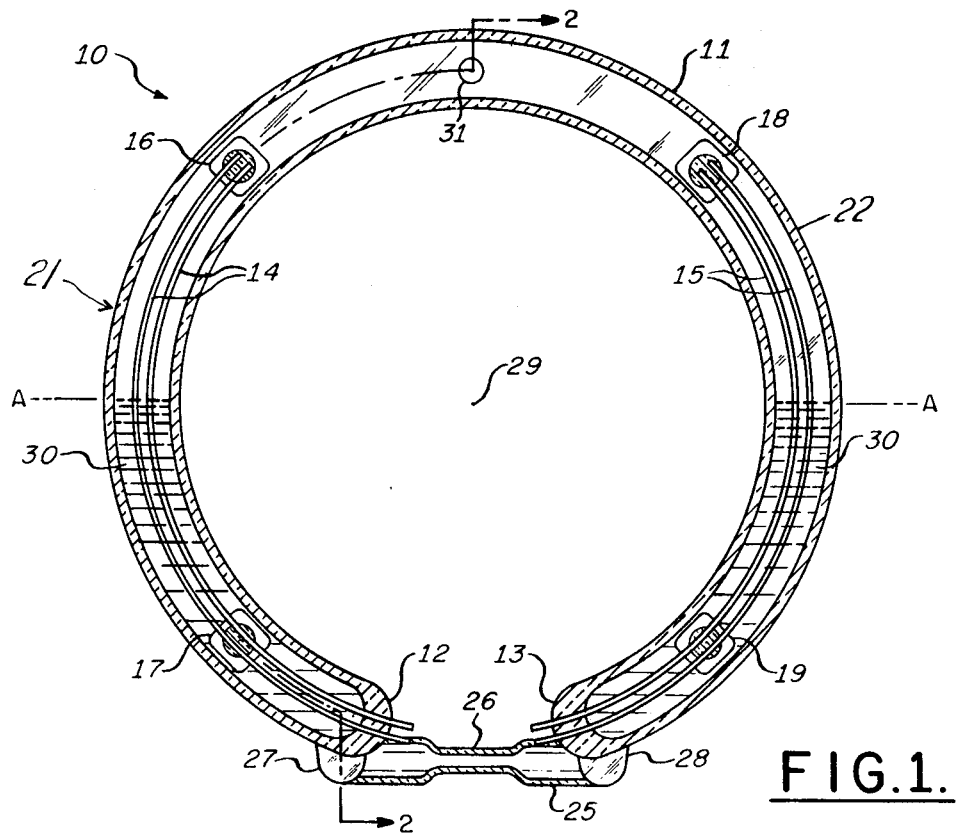
FIG.1.
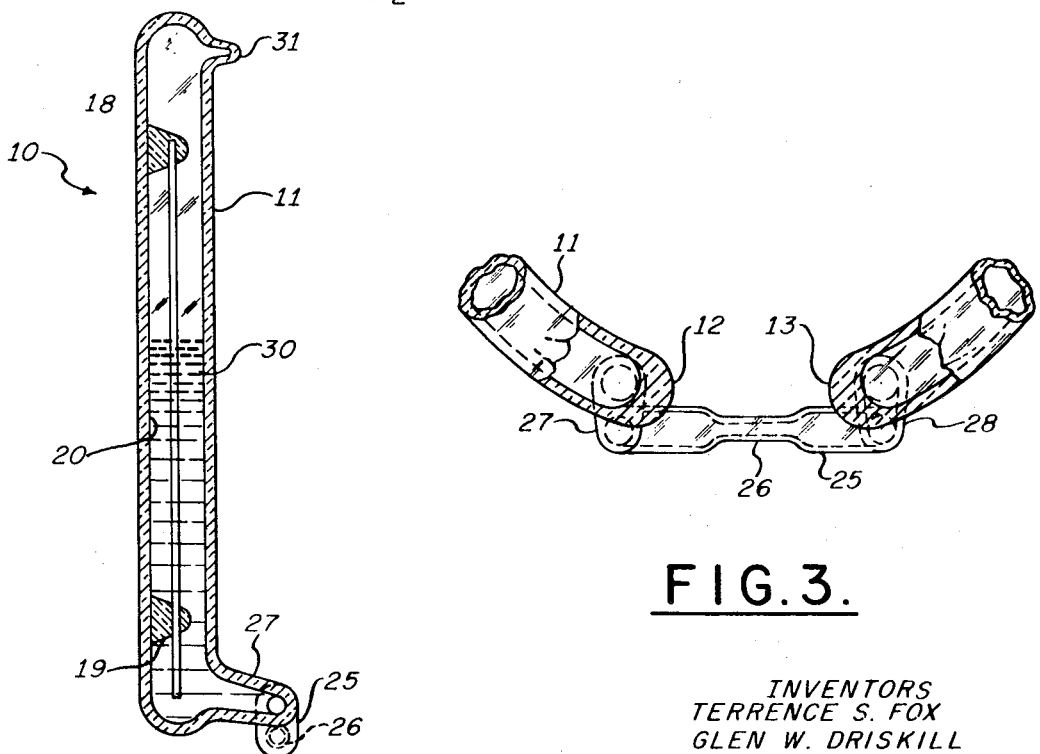
FIG.2.
FIG.3.
INVENTORS
TERRENCE S. FOX
GLEN W. DRISKILL
BY
*H P Terry*
ATTORNEY

PATENTED SEP 14 1971

INVENTORS
TERRENCE S. FOX
GLEN W. DRISKILL
BY
*H P Ferry*
ATTORNEY

TOROIDAL ELECTROLYTIC SENSOR

BACKGROUND OF THE INVENTION

1. Field of the Invention

The invention pertains to a sensor responsive to gravity and other desirable acceleration effects of a body on which it is mounted.

2. Description of the Prior Art

Acceleration and attitude sensors generally used presently, particularly with respect to gyroscopic instruments for aircraft, comprise partially filled liquid levels having either curved or straight tubes such as shown in U.S. Pat. No. 2,945,381 entitled "Reference Systems for a Dirigible Craft" of J. D. Weir issued July 19, 1960 and assigned to the same assignee as the present invention. They are generally connected directly to the center-tapped control field of a torque motor and the output torque from the torque motor then acts to precess the gyroscope in a direction to cancel the error sensed by the liquid level. The proportional range of most curved tube liquid levels is 0.5° to 1°, and thus a second sensing device is usually necessary when it is desired to remove gyroerection during accelerated maneuvers. In addition, continuous operation of the level at its upper current limit plus intermittent operation at higher levels for fast erection results in a relatively low-operating life of liquid levels in present gyroscopes and platforms.

Further, the electrolyte resistance changes by a ratio of up to 20:1 over the operating temperature range. When the liquid level is a series element in the torquer control field circuit, significant limitations are encountered in achieving efficient torque motor design and compensation of erection-rate variation over the temperature range. Verticality shifts due to temperature changes in the environment of operation also causes large errors in the signal from the presently utilized sensors. This is primarily due to the change in volume of the electrolyte as temperature is changed. The electrolyte will engulf the electrode when expanding or fail completely to make contact with the electrode when sufficiently cooled.

However, the most severe performance problem of the curved-tube-type of erection sensor is its sensitivity to sinusoidal random and spectral vibration. This sensitivity manifests itself in an "instability," i.e., breakup or frothing, of the electrolyte gas-liquid interface. The effect on "erection liquid levels" is to cause loss of torque control and vertical sensing functions of the sensor. In "erection-cutoff"-type sensor, breakup causes loss of erection completely, resulting in a free-drift gyroscope, which is an unsatisfactory condition.

SUMMARY OF THE INVENTION

The present invention provides a toroidal electrolytic sensor having a hollow tubular member of glass, for example, formed in a substantially toroidal configuration. Substantially identical arcuate-shaped pairs of electrodes are diametrically disposed within the hollow toroidal member. An electrolyte partially fills the hollow member thereby immersing portions of the pairs of electrodes for providing an electrical signal in accordance with the relative immersion of the pairs of electrodes with respect to each other. A conduit section of reduced cross-sectional area is disposed between the pairs of electrodes for damping the flow of electrolyte. The cross-sectional area of the hollow toroidal member is maintained relatively small and uniform to reduce the free-surface area of the electrolyte to the extent that there is not sufficient free surface to add impetus to the sinusoidal breakup of the electrolyte such as experienced by present day liquid levels as explained above.

A further advantage is that the toroidal sensor enjoys inherent temperature compensation due to its symmetrical configuration. Expansion and contraction of the electrolyte occurs symmetrically with respect to both pairs of electrodes and thus the null electrical characteristics remain virtually constant and verticality drift due to temperature changes from the calibration temperatures are minimized. An important additional feature is an extended sensing range and excellent linearity so that its output can also be used in conjunction with an erection amplifier, which allows it to be operated as a signal source at low current densities for improved accuracy and longer life. The use of an erection amplifier also permits the torquer to be designed as a highly efficient, balanced-phase device, and enables the entire erection control system to be easily temperature-compensated. The toroidal electrolytic sensor of the present invention due to its geometric configuration enjoys variable parameters for designing the vibration-frequency response, gain and damping ratio characteristics to be optimum with respect to a particular application.

Further, the sensor may be mounted on a gyroscopic apparatus with the center of the toroidal member aligned with the sensitive axis of the gyroscopic device in a manner such that the center of gravity of the electrolyte does not shift upon tilt of the gyroscopic axis with respect to the sensitive axis thereby eliminating a well-known cause of gyroscopic drift.

BRIEF DESCRIPTION OF THE DRAWINGS

FIG. 1 is a front elevation partly in section of a sensor of the present invention;

FIG. 2 is a right side elevation partly in section of the sensor of FIG. 1;

FIG. 3 is an enlarged front elevation of the damping section of FIG. 1;

DESCRIPTION OF THE PREFERRED EMBODIMENT

Figure 4:
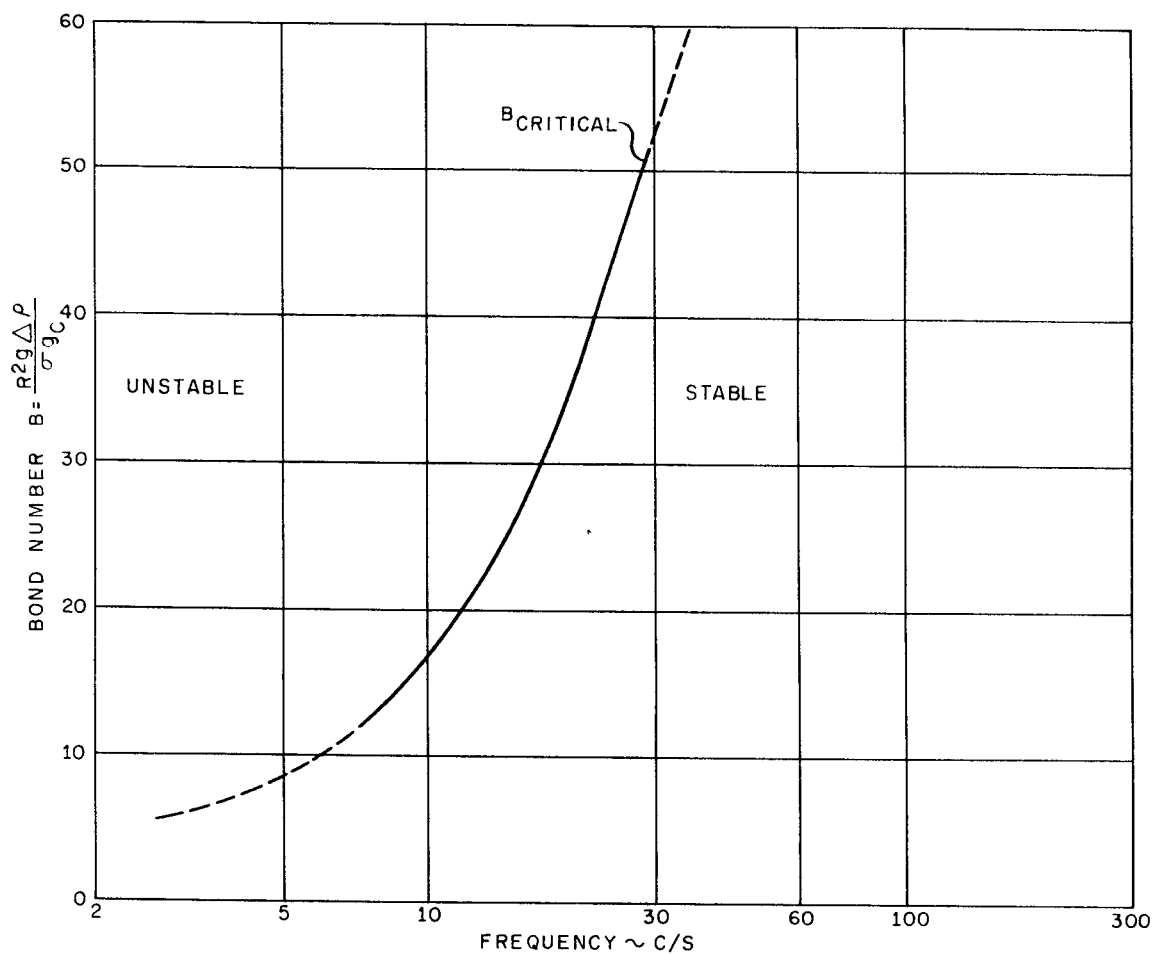
FIG. 4 is a graph of critical Bond number versus disturbing frequency for a sensor of the type shown in FIG. 1.

Referring now to FIG. 1, a toroidal electrolytic sensor 10 in accordance with the present invention is shown comprising a hollow glass tube 11 formed into a substantially symmetrical toroidal configuration of a desired diameter having first and second spaced extremities 12 and 13. Two pairs of spaced electrodes 14 and 15 are disposed within spaced portions 21 and 22 of the member 11. The first pair of spaced electrodes 14 are arcuately shaped and are inserted into the extremity 12 of the member 11 to extend within the member 11 for a predetermined angular distance, for example, 115°, where the member 11 extends 320°. Similarly, a second pair of arcuate-shaped spaced electrodes 15 are inserted into the extremity 13 to extend a similar angular distance within the member 11 thereby providing diametrically opposed symmetrical pairs of electrodes 14 and 15. Preferably, each pair of electrodes such as 14 consists of wires such as platinum having a diameter sufficiently large that each will hold its shape and are assembled into pairs by joining them with glass beads 16 and 17 spaced, for example, 90° apart prior to insertion. Similarly, the pair of electrodes 15 are joined by glass beads 18 and 19.

The beads 18 and 19 can be seen more clearly in FIG. 2 where they are shown fused to the inner wall 20 of the tubular member 11. The glass beads 16, 17, 18 and 19 are fused to only one side of the inner wall 20 to prevent bubbles from being trapped in the member 11. The extremities 12 and 13 of the tubular member 11 are closed off to provide a liquidtight seal with the extremities of the electrode pairs 14 and 15 extending therethrough for providing electrical connections. A conduit section 25 is connected near the ends of the extremities 12 and 13 between the pairs of electrodes 14 and 15 to provide a fluid-flow path therebetween.

The preferred embodiment for the best mode of operation is shown in greater detail in the enlarged view of FIG. 3, the conduit section 25 has a portion 26 with a reduced cross-sectional area for controlling the flow of fluid therethrough to the desired degree. The conduit section 25 is connected to the member 11 by means of first and second conduit connections 27 and 28 near the extremities 12 and 13, respectively. As shown more clearly in FIG. 2, the conduit connections 27 and 28, of which only conduit connection 27 is shown in FIG. 2, are disposed at an angle of 10°, for example, with respect to the member 11 to insure that no bubbles are trapped in the conduit section 25 or the connections 27 and 28 when the sensor 10 is subjected to large tilts about the sensitive axis 29 shown in FIG. 1. Referring again to FIG. 1, an electrolyte 30 is placed in the hollow member 11 via a fill tube 31 until the electrolyte 30 approximately half fills the member 11 to the reference line A—A after which the fill tube 31 is sealed off.

In practice, the electrode pairs 14 and 15 are connected in a conventional Wheatstone bridge configuration (not shown) with a common electrode being provided by connecting one electrode of each pair. With the toroidal member 11 filled to the reference line A–A with the electrolyte 30 as shown in FIG. 1, a null condition exists since both pairs of electrodes 14 and 15 are equally immersed and a zero voltage potential exists between the active or outside electrodes of each of the pairs 14 and 15 when connected in the aforementioned Wheatstone bridge configuration. With the electrolyte 30 immersing more of one pair of electrodes than another due to acceleration effects or due to tilt, a signal is provided having an amplitude and phase in accordance with the magnitude and direction of the acceleration or tilt.

In accordance with the present invention, the sensor 10 is designed to exhibit outstanding surface stability between the different fluids within the toroidal member 11. It will be appreciated that the sensor 10 may utilize any suitable combination of fluids, such as liquid and gas or two nonmiscible fluids of different densities.

At the interface 32 between the two fluids of different densities, conditions of surface forces and acceleration forces are defined by a dimensionless number known as the Bond number ($B$).

$$B = \frac{R^2 g \Delta \rho}{\sigma g_c} < C$$

where:

$R$—the characteristic dimension, e.g., the internal radius of the tube 11;
$g$—acceleration (imposed perturbing force);
$\Delta \rho = \rho_2 - \rho_1$—the difference in densities of the interface fluids;
$\sigma$—the surface tension;
$g_c$—the acceleration of gravity. The constant $C$ is typically dependent on $f$ the perturbation frequency. Qualitatively the Bond number is the most significant indication of functional performance at high excitation frequency. (i.e., greater than 7 c./s.). The Weber number is governing at low frequency when inertial forces become more important. The Weber number ($W$) is defined as the ratio of surface to inertial forces:

$$W = 4V \sigma g_c / g^{3/2} d^{5/2} \Delta \rho$$

where:

$\sigma$—surface tension
$V$—Velocity
$g_c$—gravity
$g$—acceleration (imposed perturbing force)
$d$—characteristic dimension
$\rho$—density The Froude number ($F$) is a dimensionless measure of the inertia and gravity $$F = V / \sqrt{gd}$$

$V$—velocity
$g$—acceleration (imposed perturbing force)
$d$—characteristic dimension These three dimensionless groups can be related as, $$B = F / W$$

Together they supply appropriate groups for analysis of surface stability.

For the application to gyroscopics the Bond dimensionless group is the most important. The reason being that other design consideration requires that vibration isolation systems be devised to protect gyroscopic components in their normal operating environment other than the subject sensors. The characteristics of the isolation systems are such that amplification of 15–30 hertz signals is accomplished. This undesirable amplification can be as high as three times the input. This means that the $B$ number is increased:

$$B \text{amplified} = 3^B \text{inputs}$$

A change of 300 percent in Bond number is a drastic change, in the undesirable direction, in light of the available ranges of the other parameters $R$, $\rho$ and $\sigma$.

A graph of the critical Bond number versus the disturbing frequency, i.e., vibration, is shown in FIG. 4. The region to the right of the curve provides a stable fluid interface while the region to the left of the curve indicates an unstable condition. The dashed portion of the curve is extrapolated.

Figure 5:
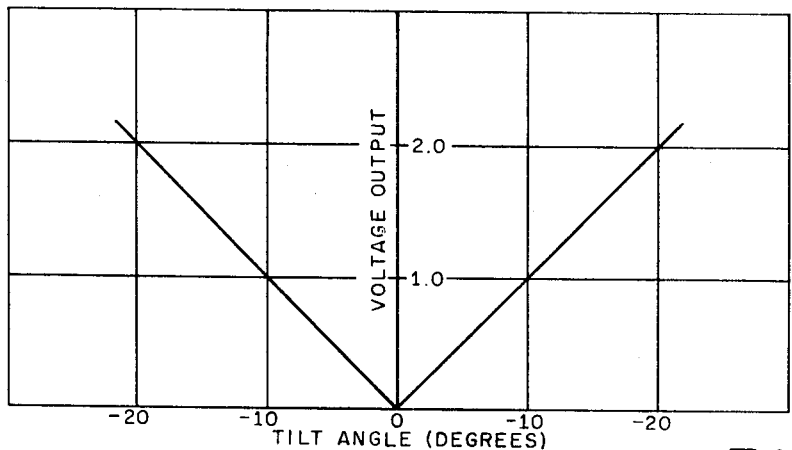
FIG. 5 is a graph of voltage output versus tilt angle of the sensor of FIG. 1.

A toroidal electrolytic sensor 10 having the following characteristics was found suitable for a particular gyroscopic application. Each electrode comprised a 0.017-inch diameter platinum wire with the spacing between each electrode of a pair being 0.050 inch. The inside diameter of the toroidal member 11 was 0.150 inch with the damping orifice being 0.058 inches ID. The overall diameter of the device 10 was 2.2 inches. The electrolyte consisted of low-normality salt in alcohol. A typical output curve of the toroidal electrolytic sensor 10 of the present invention constructed in accordance with the above is shown in the graph of FIG. 5 which provides an indication of the voltage output with respect to the tilt angle. It will be noted that the linearity is extraordinarily uniform over a wide range of tilt angle.

Alternative electrode arrangements are also feasible, for example, diametrically opposed single electrodes may be utilized in lieu of a pair of electrodes within the toroidal member 11 in combination with the interior of the toroidal member 11 being plated with a conductive material adjacent the respective electrodes thereby forming diametrically opposed spaced electrodes which may be connected as explained above in a Wheatstone bridge configuration.

When the sensor 10 is cycled through small clockwise and counterclockwise tilt inputs, essentially zero hysteresis exists if given sufficient time to settle. However, if large displacements occur, the upper portion of the electrodes and inner walls are wetted by the electrolyte. In certain configurations, it may then require 2 minutes for a null of less than 0.1° to return, for example. This problem can be overcome by rinsing the inner walls of the toroidal member 11 with silicone oil and then baking the oil into the glass surface. Then only a few seconds is required to achieve acceptable null conditions in the presence of large tilt angles.

It will be appreciated that the following desired characteristics of an erection-control accelerometer are met by the present invention (23) large pendulosity and low hysteresis to obtain high vertical accuracy; (2) a gravity-sensing element which is not affected by vibration; and (3) high-flow control for extending vibration insensitivity to very low frequencies. The flow control is adjusted to provide the optimum frequency response by control of the cross-sectional area of the damping conduit 25.

Figure 6:
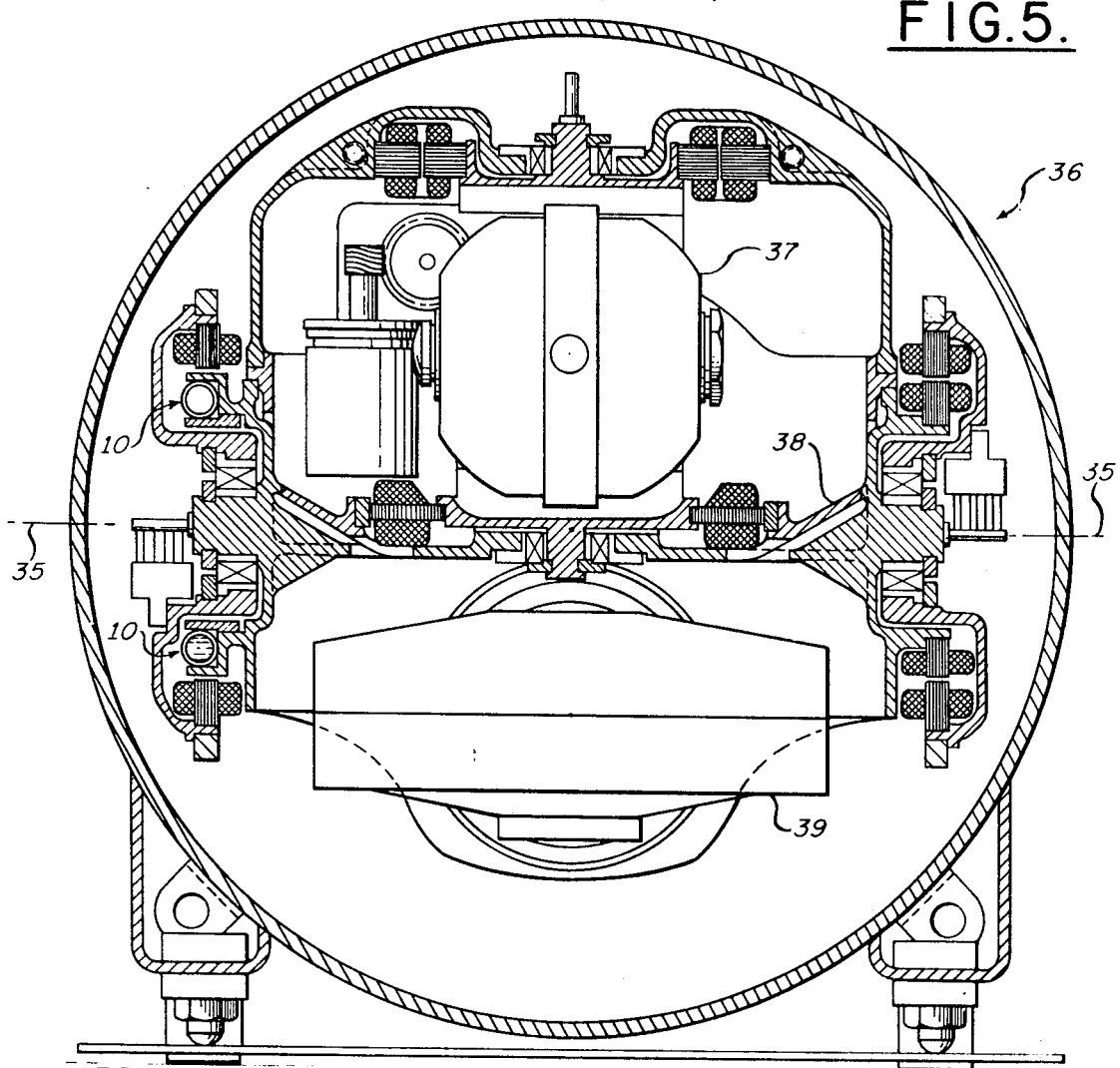
FIG. 6 is a vertical view partly in section of a stable platform utilizing the sensor of FIG. 1.

A further advantage of the present invention will be appreciated by referring to FIG. 6 in which the toroidal electrolytic sensor 10 of the present invention is mounted with its center coincident with the pitch axis 35 of a stable platform 36. The stable platform 36 is shown for purposes of example having a directional gyroscope 37 mounted on a platform 38 to which is also secured a vertical gyroscope 39. It will be appreciated that with the toroidal sensor 10 mounted as shown such that it surrounds the sensitive axis 35 about which it is intended to sense tilt in pitch, there is no coercive force tending to cause undesirable torquing of the stable platform 36 during tilt as would be true with a conventional liquid level. The reason is that the center of gravity of the electrolyte 30 within the member 11 does not shift with respect to the sensitive or pitch axis 35 and thus induces no undesirable torque which would tend to cause precession of the platform 36. In a normal liquid level arrangement, such as shown in said U.S. Pat. No.

2,945,381, the movement of the electrolyte in the liquid level to engage a contact results in a change in the center of gravity and creates a moment of force which creates a torque about one axis of the device on which it is mounted which results in precession about another axis at right angles to the first axis. This problem is eliminated by mounting the sensor 10 such that its center is coincident with the sensitive axis of a gyroscope or platform.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. An electrolytic sensor comprising
   hollow tubular nonconducting means including first and second spaced portions having a substantially symmetrical configuration with respect to a reference axis,
   first and second substantially identically shaped spaced electrode means secured within said first and second spaced portions respectively parallel to the longitudinal axis of said hollow tubular nonconducting means,
   said first and second electrode means being substantially symmetrical opposed with respect to each other and said reference axis,
   means including a current-conducting fluid partially filling said hollow tubular nonconducting means and partially immersing portions of said first and second electrode means for providing an electrical signal in accordance with the relative immersion of said first and second electrode means with respect to each other, and
   said first and second portions having an internal cross-sectional area with a characteristic dimension for providing stability of the surface of said conducting fluid as a function of at least said characteristic dimension, acceleration forces and the density of said fluid.

2. A sensor of the character recited in claim 1 including
   a second fluid filling the remainder of said hollow tubular nonconducting means and said characteristic dimension of said internal cross-sectional area provides stable surface interface in accordance with the Bond number which equals the square of the internal radius of said tubular means times the perturbing acceleration times the difference in densities of said conducting and second fluids divided by the surface tension times the acceleration of gravity.

3. A sensor of the character recited in claim 1 including
   a section of reduced cross-sectional area disposed between said first and second spaced portions controlling the flow of fluid therethrough and providing damping of surface oscillations resulting from perturbation frequencies.

4. A sensor of the character recited in claim 1 in which said hollow tubular means has a relatively small cross-sectional area to limit the free-surface area of said fluid for minimizing undesirable fluid breakup during vibration.

5. A sensor of the character recited in claim 3 in which said hollow tubular means forms a partial toroid having first and second extremities, and a conduit section is connected between said first and second extremities by first and second conduit connections respectively,
   said first and second conduit connections being disposed at an angle with respect to said hollow tubular means to avoid trapping bubbles in said conduit section and connections.

6. A sensor of the character recited in claim 1 in which said hollow tubular means is toroidal and said spaced electrode means are arcuately shaped.

7. A sensor of the character recited in claim 6 mounted on a gyroscope having a sensitive axis and torquing means for precessing said gyroscope, the improvement comprising
   said sensor being symmetrically disposed with respect to said sensitive axis such that movement of said fluid within said hollow tubular means does not result in an undesirable precession torque about said sensitive axis.

8. A sensor of the character recited in claim 7 in which
   said hollow tubular means has its center aligned with said sensitive axis,
   said hollow tubular means surrounding said sensitive axis such that tilt of said gyroscope causing movement of said fluid within said hollow tubular means does not result in an undesirable shift in the center of gravity of said fluid.

9. A sensor of the character recited in claim 6 mounted on a stable platform having a sensitive axis and torquing-means for torquing said platform,
   the improvement comprising said sensor being symmetrically disposed with respect to said sensitive axis such that movement of said fluid within said hollow tubular means does not result in an undesirable torque about said sensitive axis.